United States Patent
Richter

(10) Patent No.: US 6,901,267 B2
(45) Date of Patent: May 31, 2005

(54) RECOGNITION OF WIDE-BAND DATA SEQUENCES

(75) Inventor: Thomas Richter, Lauf (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 529 days.

(21) Appl. No.: 09/817,977

(22) Filed: Mar. 27, 2001

(65) Prior Publication Data

US 2001/0049290 A1 Dec. 6, 2001

(30) Foreign Application Priority Data

Mar. 29, 2000 (DE) .......................................... 100 15 630

(51) Int. Cl.[7] .............................................. H04B 15/00
(52) U.S. Cl. ...................... 455/502; 455/560; 455/515; 370/324; 370/358
(58) Field of Search ................................ 455/436, 438, 455/502, 515, 516, 517, 464, 455; 370/324, 322, 331, 350, 349, 332, 333

(56) References Cited

U.S. PATENT DOCUMENTS 4,905,234 A * 2/1990 Childress et al. .......... 370/94.1
5,768,268 A * 6/1998 Kline et al. ................ 370/330
6,331,976 B1 * 12/2001 Sriram ....................... 370/350

* cited by examiner

Primary Examiner—Nick Corsaro
Assistant Examiner—Alan Gantt
(74) Attorney, Agent, or Firm—Aaron Waxler

(57) ABSTRACT

Improvement is afforded in the recognition of wide-band data transmitted in the form of a data sequence to a network element of an analog, cellular network, notably a mobile radio set or a base station. The sequence includes a starting synchronization (DOT1), a word synchronization (WS), a data word (REP1) and number of repeats of a synchronization (DOT), a word synchronization (WS) and the data word (REP 1–REP 11). The network element recognizes, from received sequences, that a transmission of a sequence occurs when a starting synchronization (DOT 1) has been recognized, or alternatively when one of the further synchronizations (DOT) that is succeeded by a correct word synchronization (WS) has been recognized, and evaluates the data words (REP 1–REP 11) received each time subsequent to a recognized starting synchronization (DOT 1) that is succeeded by a word synchronization (WS), or received subsequent to a recognized further synchronization (DOT) that is succeeded by a correct word synchronization (WS).

6 Claims, 5 Drawing Sheets

| DOT1 | WS | REP 1 | DOT | WS | REP 2 | DOT | WS | REP 3 | DOT | WS | REP 4 | DOT | WS | REP 5 | DOT | WS | REP 6 | DOT |
|---|---|---|---|---|---|---|---|---|---|---|---|---|---|---|---|---|---|---|
| 101 bit | 11 bit | 40 bit | 37 bit | 11 bit | 40 bit | 37 bit | 11 bit | 40 bit | 37 bit | 11 bit | 40 bit | 37 bit | 11 bit | 40 bit | 37 bit | 11 bit | 40 bit | 37 bit |

| WS | REP 7 | DOT | WS | REP 8 | DOT | WS | REP 9 | DOT | WS | REP 10 | DOT | WS | REP 11 | |
|---|---|---|---|---|---|---|---|---|---|---|---|---|---|---|
| 11 bit | 40 bit | 37 bit | 11 bit | 40 bit | 37 bit | 11 bit | 40 bit | 37 bit | 11 bit | 40 bit | 37 bit | 11 bit | 40 bit | .......... |

| DOT1 | WS | REP 1 | DOT | WS | REP 2 | DOT | WS | REP 3 | DOT | WS | REP 4 | DOT | WS | REP 5 | DOT | WS | REP 6 | DOT |
|---|---|---|---|---|---|---|---|---|---|---|---|---|---|---|---|---|---|---|
| 101 bit | 11 bit | 40 bit | 37 bit | 11 bit | 40 bit | 37 bit | 11 bit | 40 bit | 37 bit | 11 bit | 40 bit | 37 bit | 11 bit | 40 bit | 37 bit | 11 bit | 40 bit | 37 bit |

| WS | REP 7 | DOT | WS | REP 8 | DOT | WS | REP 9 | DOT | WS | REP 10 | DOT | WS | REP 11 |
|---|---|---|---|---|---|---|---|---|---|---|---|---|---|
| 11 bit | 40 bit | 37 bit | 11 bit | 40 bit | 37 bit | 11 bit | 40 bit | 37 bit | 11 bit | 40 bit | 37 bit | 11 bit | 40 bit |

FIG. 1

RECOGNITION OF WIDE-BAND DATA SEQUENCES

BACKGROUND OF THE INVENTION

1. Field of the Invention

The invention relates to a network element of an analog, cellular network, notably a mobile radio set or a base station, as well as to a method for a network element of an analog, cellular network for receiving a wide-band data sequence that is composed of a starting synchronization, a word synchronization, a data word and a fixed number of repeats of a further synchronization, a word synchronization and the data word.

2. Discussion of the Prior Art

The transmission of data with the described format is intended, for example, for the US system AMPS (Advanced Mobile Phone System) that is known from the standards TIA/EIA/IS-91 ("Mobile Station—Land Station Compatibility Standard for 800 MHz Analog Cellular", 1994) and TIA/EIA/IS-136.2-A ("TDMA Cellular/PCS—Radio Interface—Mobile Station—Base Station Compatibility—Traffic Channels and FSK Control Channel", October 1996) for the message channel Forward Voice Channel (or FVC) from a base station to a mobile radio set. The data sequence to be used for this channel amounts to 1032 bits and is shown for a transmitted word, by way of example, in FIG. 1. A long starting synchronization "DOT1" of 101 bits is succeeded by a word synchronization "WS" with 11 bits and the first transmission of the data word "REP1" to be transmitted with 40 bits. Subsequently, there are 10 repeats of a shorter synchronization "DOT" with 37 bits, of a word synchronization "WS" with 11 bits, and of the data word "REP2–REP11" to be transmitted. The starting synchronization (DOT1) as well as the further synchronizations (DOT) therein consist of a "dotting" sequence consisting of alternating zeros and ones.

Wide-band data sequences of this kind are used for the transmission of a single data word, for example, for hand-over requests from a base station to a mobile radio set during an on-going analog speech transmission, in order to trigger the mobile radio set to change over to a channel with a better reception quality in the case of poor reception.

If more than one data word is to be transmitted, for example in the framework of short messages or for an exchange of authentification data, the data sequence of 1032 bits shown in FIG. 1 will be successively used for each of the data words to be transmitted.

In the case of an analog speech transmission, the part of a network element that serves to decode data sequences received must continuously monitor the audio stream during the speech transmission in order to detect any wide-band data transmissions. For normal implementations within the framework of AMPS the recognition of a 101-bit starting synchronization is used to assume that a data transmission has commenced. The network element should subsequently be synchronized in conformity with the 101-bit starting synchronization and the word synchronization before the various repeats of the actual data word can be received. Each of the repeats of the data word is customarily encoded with a 40,28 BCH (Bose-Chaudhuri-Hocquenghem) code, so that some errors in the data word can be recognized and even be corrected, if necessary. After having received the eleven repeats of the data word, the network element can perform a selection procedure on the stored repeats of the data word and apply the data word ultimately selected to a further processing item.

The implementations that are known from practice have the drawback that data words of a received data sequence are not detected when the starting synchronization has not been recognized because of poor receiving conditions, so that in that case the message is lost. Consequently, for example, necessary hand-overs cannot take place so that an on-going speech connection could be interrupted in a particularly bad case.

SUMMARY OF THE INVENTION

It is an object of the invention to provide a network element and a method for an analog, cellular network that offer better recognition of wide-band data that is transmitted in the form of a data sequence with a starting synchronization, a word synchronization, a data word and a fixed number of repeats of a synchronization, a word synchronization and the data word.

This object is achieved on the one hand by means of a network element as disclosed in claim 1.

This object is achieved on the other hand by means of a method as disclosed in claim 6.

The network element in accordance with the invention and the method in accordance with the invention offer the advantage that the likelihood of correct reception of messages transmitted with the fixed data format between elements of the network is higher. This advantage becomes manifest notably when the starting synchronization cannot be evaluated in the receiving network element due to poor receiving conditions. The receiving conditions can be influenced notably by fading and interference but also by other disturbances.

The network element in accordance with the invention and the method in accordance with the invention can thus enhance above all the quality of connections for the transmissions of control signals consisting of one word, so that the performance of the mobile radio sets and the network are enhanced from a point of view of the mobile radio subscriber.

The invention can be applied notably for transmissions from a base station to a mobile radio set in the message channel defined for AMPS. However, it is limited neither to such transmissions nor to data sequences involving the previously given numbers of repeats and the previously indicated lengths of the individual parts of a data sequence.

Preferred embodiments of the network element in accordance with the invention are disclosed in the dependent claims.

BRIEF DESCRIPTION OF THE DRAWINGS

An embodiment of the invention will be described in detail hereinafter with reference to drawings. Therein:

FIG. 1 shows a data sequence in conformity with the message channel defined for AMPS for transmissions from a base station to a mobile radio set;

DETAILED DESCRIPTION OF THE PREFERRED EMBODIMENTS

FIG. 1 has already been described in the above-provided "BACKGROUND OF THE INVENTION" section.

Like FIG. 1, the FIGS. 2a–2d show a respective data sequence of 1032 bits in conformity with the definition of data channels in the AMPS standard.

It is assumed that correct reception of 6 blocks, consisting of the starting synchronization DOT1 or the synchronization DOT, the word synchronization WS and each time repeat of the data word REP1–REP11, suffices to ensure that the transmitted data word can be correctly recognized. Correct reception of a block implies that a synchronization DOT1, DOT was found, that the word synchronization WS was received as expected, and that no error occurred in the BCH decoding of the data word REP1–REP11. Because the predominant part of the repeats REP1–REP11 was received without recognizable error in this case and only a minority was incorrectly decoded, or could not be decoded at all, that is to say, no more than 5 of 11 data words REP1–REP11, this assumption is very likely correct. The search for a synchronization takes place continuously, a short or a long synchronization being expected in dependence on the implementation.

Figure 2A:
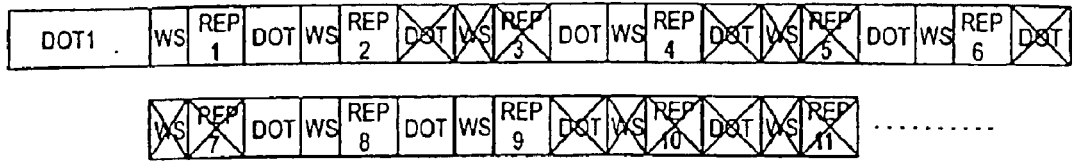
FIG. 2*a* shows a data sequence as shown in FIG. 1 that can be evaluated by means of a network element according to the state of the art.
Figure 2B:
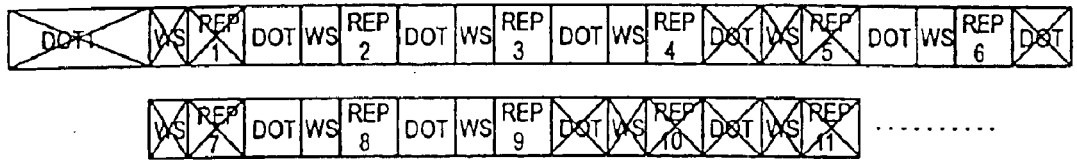
FIG. 2*b* shows a data sequence as shown in FIG. 1 that can be evaluated by means of a network element in accordance with the invention.

In conformity with the state of the art the first synchronization sequence, that is, the starting synchronization with 101 bits, the subsequent word synchronization WS and the subsequent data word REP1 and at least 5 further blocks must be correctly received. This corresponds to 592 bits of the total number of 1032 bits or a percentage of 57% of the data sequence. FIG. 2a shows, by way of example, blocks that are crossed out so as to indicate that they may be disturbed in data sequences received in accordance with the state of the art, however, without the disturbances having an effect on the recovery of the data word REP1–REP11 of interest.

However, when a network element in accordance with the invention is used, the starting synchronization DOT1 need not necessarily be correctly received; instead the recognition of 6 arbitrary blocks within the data sequence suffices. For example, the data sequence shown in FIG. 2b also qualifies for correct reception even though the blocks of the first, the fifth, the seventh, the tenth and the eleventh repeat of the data word, REP1, REP5, REP7, REP10, REP11, could not be correctly received; this is again indicated by the crossing out of the blocks.

Thus, using a network element in accordance with the invention 528 bits of the 1032 bits, or 51% of the data sequence, already suffice as a basis for an evaluation. This means an enhancement of the receiving reliability by about 6%; additionally more possibilities exist for the distribution of the 6 blocks to be correctly received within the data sequence.

The network elements and the method in accordance with the invention provide a more advantageous data recognition even when the maximum permissible lengths of a disturbance of the data sequence are investigated.

Figure 2C:
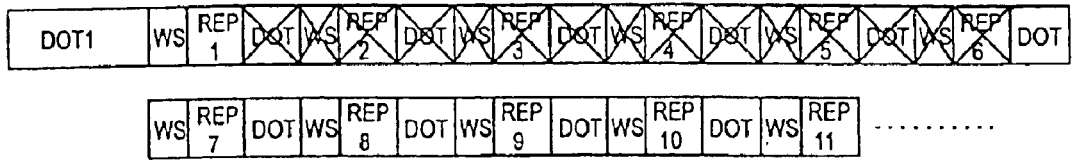
FIG. 2*c* shows a second data sequence that can be evaluated by means of a network element according to the state of the art.

Thus far no more than five coherent blocks with a short, that is, 37-bit, synchronization DOT were allowed to be disturbed; this is shown by way of example in FIG. 2c. The maximum permissible outage time thus amounted to 5×88 bits=440 bits. This corresponds to a period of time of 44 ms in the case of a data stream of 10 kbit/s.

Figure 2D:
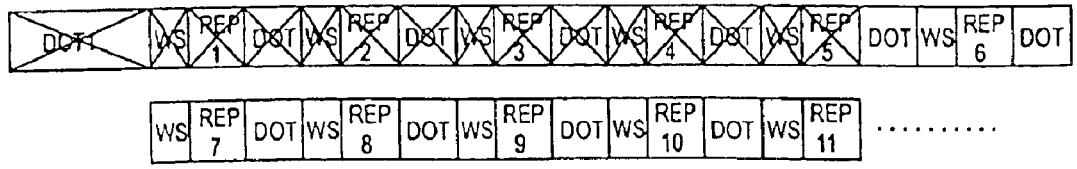
FIG. 2*d* shows a second data sequence as shown in FIG. 1 that can be evaluated by means of a network element in accordance with the invention.

However, because the network elements in accordance with the invention also accept data sequences in which the starting synchronization DOT1 is disturbed, as is shown in FIG. 2d, and the starting synchronization DOT1 of 101 bits is longer than the 37-bit synchronizations DOT of a data sequence, the maximum permissible outage time may be increased to 504 bits=50.4 ms by means of network elements in accordance with the invention. When the outage time has commenced already before the arrival of the starting synchronization DOT1, the outage time may even be longer in individual cases.

Related to the maximum permissible outage time within a data sequence, the invention offers an improvement of up to 14%, because up to 14% longer outage times on the basis of fading gaps etc. can be accepted thus far. The total 14% is obtained whenever the complete starting synchronization DOT1 is actually disturbed. The implementations used thus far, however, do not enable any recognition of the data stream at all when the starting synchronization DOT1 is disturbed.

The selection strategy underlying the FIGS. 2a,b,c,d and 3a,b is based on the assumption that the majority of the repeats of the data words REP1–REP11, transmitted by the base station, can be decoded and that the decoded data words must be the same. According to another selection strategy, all correctly received repeats of a data word REP1–REP11 form the basis of the selection, irrespective of the number of correctly received repeats of the data words. If different versions of the data word are available after the decoding, the data word occurring most frequently is assumed to be the correct one.

Figure 3A:
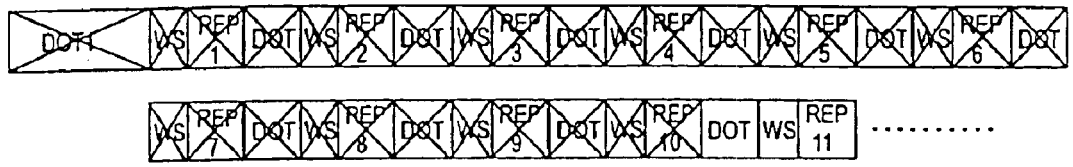
FIG. 3a shows a third data sequence that can be evaluated by means of a network element according to the state of the art.

Using this selection strategy, generally speaking, outage times can be accepted that are longer than the outage times in the FIGS. 2 and 3, because only one block need be correctly received as a minimum. For the network elements that are known from the state of the art, however, this at least one block is necessarily the first block with the starting synchronization DOT1 in conformity with FIG. 3a, because reception of a data sequence is assumed only when the starting synchronization DOT1 has been recognized. Thus, in this case the maximum permissible outage time amounts to 880 bits=88.0 ms or 85% of the overall time (again for a data stream of 10 kbit/s).

Figure 3B:
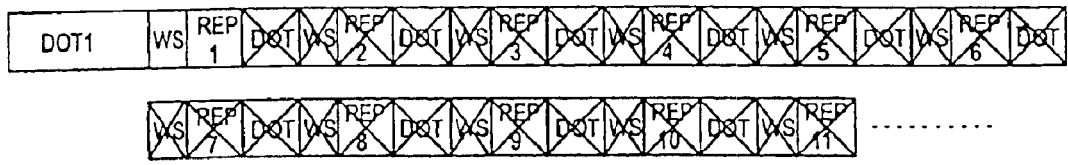
FIG. 3b shows a third data sequence as shown in FIG. 1 that can be evaluated by means of a network element in accordance with the invention.

For the network elements in conformity with the invention, however, an arbitrary block can serve as the at least one block to be correctly received in the case of the second selection strategy. Because the starting synchronization DOT1 with a length of 101 bits may also fail in this case, the maximum outage time to be tolerated in this case amounts to 944 bits=94.4 ms or 91% of the overall time, that is, when the correctly received block is the last block of the data sequence as shown in FIG. 3b.

The correct reception of a message with a plurality of words may be of subordinate importance to the mobile radio subscriber in comparison with the reception of messages with one word, notably of hand-over messages. The reception of such messages, however, can also be enhanced by means of the network elements in accordance with the invention and the method in accordance with the invention as will be described in detail hereinafter. The first selection strategy for which at least 6 blocks of a data sequence must be correctly received will be used as a basis at the beginning.

Separate consideration of multi-word messages is necessary because such messages consist of a concatenation of a plurality of data sequences, each of which serves for the transmission of data words REP1–REP11 that are repeated several times. When the starting synchronization DOT1 of one of the data sequences is not recognized, it will not be clear which of the recognized blocks must be assigned to which data sequence.

If the starting synchronization DOT1 of the first data sequence was received without disturbance, because of the known position of the data sequences the second sequence can be detected independently of the recognition of the second starting synchronization DOT1.

Figure 4A:
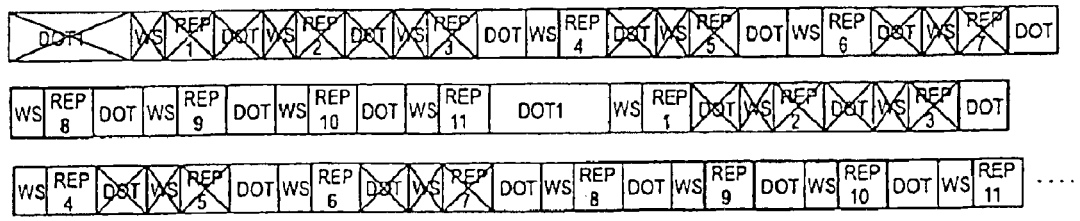
FIG. 4a shows an example of two successive data sequences without a disturbance of the second starting synchronization.

If the starting synchronization DOT1 of the first data sequence is already disturbed and if, for example, only the fourth block of the first data sequence is the first block correctly received, as is shown in FIG. 4a, it cannot be recognized at first how far the first data sequence extends. However, when the receiving synchronization DOT1 of the second data sequence is correctly received in conformity with FIG. 4a, the end of the first data sequence is unambiguously defined and the second data sequence can be received and evaluated as usual.

The situation is more difficult when, after a non-recognized starting synchronization DOT1 of the first data sequence, the starting synchronization DOT1 of the second data sequence is also disturbed. For such cases it make sense to make a distinction between a slightly disturbed starting synchronization DOT1 of the second data sequence and a seriously disturbed starting synchronization DOT1 of the second data sequence.

Figure 4B:
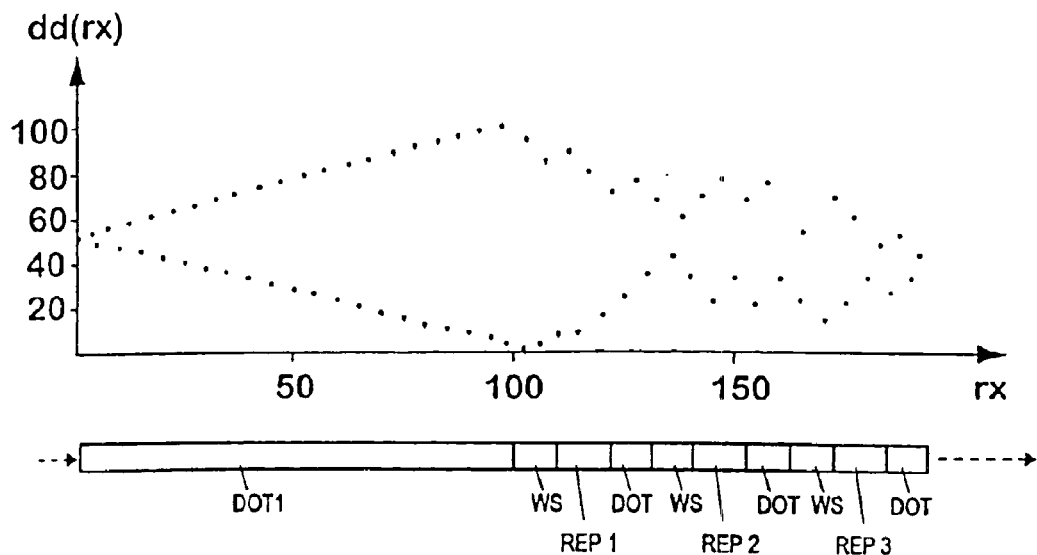
FIG. 4b shows a graph illustrating the bit-wise reception of the starting synchronization in the case of a second starting synchronization without disturbance.

Slightly disturbed starting synchronizations DOT1 can be detected by way of a continuous measurement that always stores the last 101 bits of the data stream received in a data buffer. The stored bits are also continuously compared with a separately stored, correct sequence of the starting synchronization DOT1. The number of deviating bits dd(rx) is continuously determined during the comparison. FIG. 4b shows the result of such a measurement, that is, the number dd(rx) of the deviations among the received bits rx (data bits) for a correctly received starting synchronization DOT1. The starting synchronization DOT1 of 101 bits is assumed to consist of a sequence of successive ones and zeros "101010 . . . 10101". For the sake of clarity it was assumed that the data buffer in which the 101 bits are loaded for the comparison is filled with zeros at the beginning. Moreover, only a reduced number of bits is shown for the sake of clarity.

When exactly the 101 bits of a starting synchronization DOT1 are stored in the data buffer, rx(101), the comparison with the expected sequence yields a number of zero deviations dd(rx) in the case of a correct starting synchronization DOT1. During the further transport of the arriving bits through the data buffer, a number of zero deviations will no longer be attained, since the number varies about a value of approximately 50 in the case of random distributed data, that is, until the next starting synchronization 101 commences.

Figure 4C:
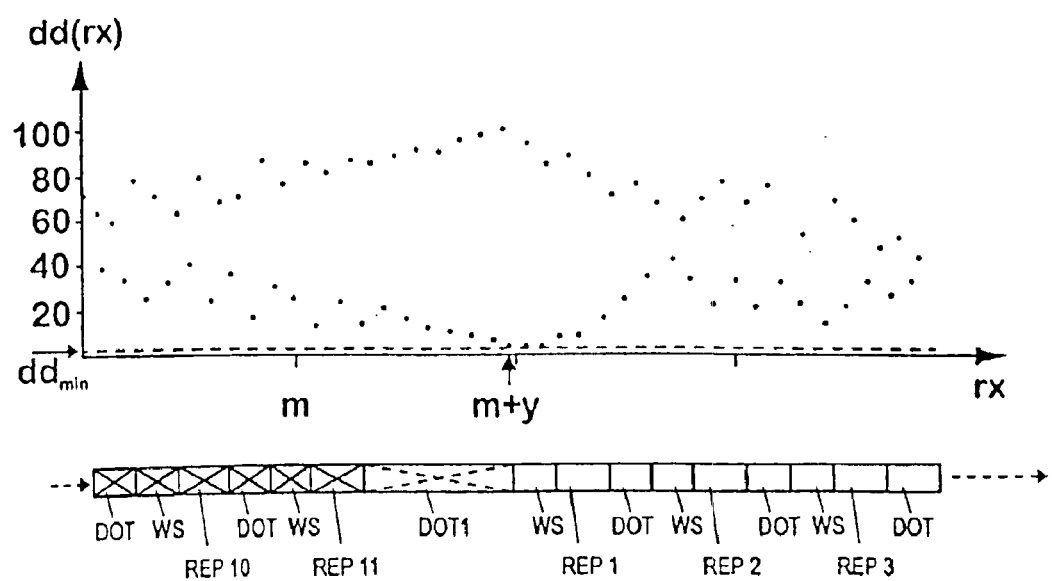
FIG. 4c shows a graph illustrating the bit-wise reception of the starting synchronization in the case of a second starting synchronization with a slight disturbance.

However, when instead of a correct a disturbed starting synchronization DOT1 is received, the number of zero deviations can never be attained. In the rendition of the detected number of deviations dd(rx) in the case of a disturbed starting synchronization as shown in FIG. 4c, only a minimum value $dd_{min}$ is reached. A starting synchronization DOT1 that is incorrect only in respect of a few bits, however, can be recognized with a high likelihood when the continuously detected number of deviations dd(rx) drops below a fixed number near zero. For example, a minimum number $dd_{min}=5$ attained during the comparison may be considered to be adequate for recognition of a starting synchronization DOT1 with 101 bits. As soon as a defined minimum number $dd_{min}$ is reached, a change over from a first data sequence to a second data sequence is assumed. The detection of repeats of the data words, therefore, is ended for the first data word and is continued instead for the next data word. The detected repeats of the first data word REP1–REP11 can then be used for the selection process. The data acquired during the 101-bit starting synchronization DOT1 must be rejected, because bit exact detection of a disturbed starting synchronization is impossible.

Figure 4D:
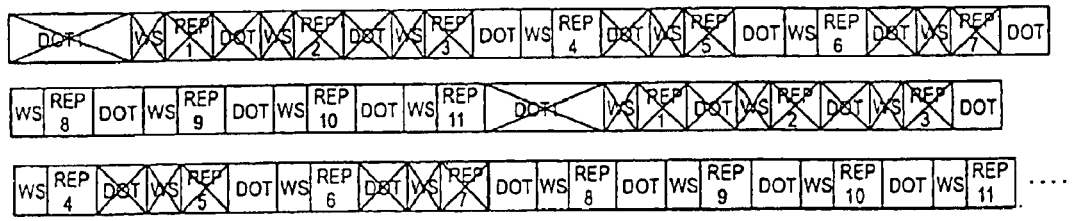
FIG. 4d shows an example of two successive data sequences with a seriously disturbed second starting synchronization.

Seriously disturbed starting synchronizations DOT1, however, cannot be detected by means of this method either. FIG. 4d shows two successive data sequences with the repeats of two different data words and each time a seriously disturbed starting synchronization DOT1.

The blocks with the fourth, the sixth, the eighth, the ninth, the tenth and the eleventh repeat of the data words are correctly received in the first as well as in the second data sequence. Because 14 decoding attempts are made from the fourth block of the first data sequence until the fourth block of the second data sequence, but each data word is repeated only 11 times, it is known that the correctly received fourth block of the second data sequence must also belong thereto.

In the least favorable case the last six blocks of the first data sequence are correctly received, so that the evaluation means of the network element must still deal with up to four further repeats of the same data word. In the second data sequence four further attempts are then made so as to decode further repeats of the first data word, that is, two thereof during the 101-bit starting synchronization DOT1 of the second data sequence. Overall, up to three correctly decoded repeats of the second data word REP1–REP3 can thus be unduly admitted to the selection procedure for the first data word. This is because, depending on the reset conditions of the implementation of the algorithm, for example, a disturbed starting synchronization DOT1 of the second data word may also be interpreted as a further 37-bit synchronization DOT of the first data word. The remaining eight repeats of the second data word REP4–REP11 can be used for the selection thereof. Thus, even two more repeats of the second data word REP4–REP11 may be lost without affecting the usability of the second data word so as to obtain the necessary six correctly received blocks.

Because each of the blocks with 37-bit synchronization DOT has a duration of 8.8 ms in the case of a data stream of 10 kbit/s, the evaluation means of the network element can alternatively also check whether a period of time that is divisible by 8.8 is present between two correctly recognized blocks.

If this is not the case, it is assumed that a block with a non-recognized 101-bit starting synchronization DOT1 is present between the two blocks and that, therefore, the second block already belongs to another data sequence.

The invention can also be used also in a case where the starting synchronization DOT1 of a second data sequence is seriously disturbed, be it with the consequence that a smaller number of repeats is then available for the reception of the next data word.

Figure 5:
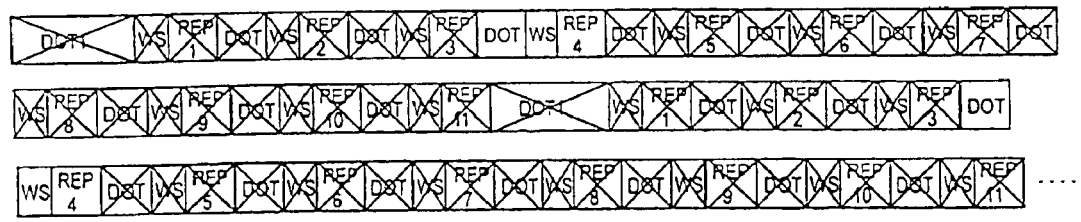
FIG. 5 shows a further example of two successive data sequences with a seriously disturbed second starting synchronization.

The second selection strategy described is also suitable for multi-word transmissions. When the starting synchronization DOT1 of the first data sequence as well as of the second data sequence is disturbed, as shown in FIG. 5, correctly detected blocks can then be allocated to the various data words only if the length of the time interval between the beginning of the first correctly detected block until the beginning of a further correctly detected block amounts to at least one complete data sequence, so in this case a length of 1032 bits or a duration of 103.2 ms. However, a disturbed multi-word transmission can be correctly detected at least when this condition is satisfied. Finally, it is to be noted that the network elements in accordance with the invention and the method in accordance with the invention can also be used for data sequences in which all blocks do not contain the same data word but two or more data words in an alternating, recurrent fashion. Therefore, depending on the selection strategy, each time at least one data word or at least a given number of each of the different data words must be correctly received so as to enable evaluation.

What is claimeed is:

1. A network element of an analog, cellular network, notably a mobile radio set or a base station, including receiving means for receiving a wide-band data sequence that is composed of a starting synchronization (DOT1), a word synchronization (WS), a data word (REP1) and a fixed number of repeats of a further synchronization (DOT), a word synchronization (WS) and the data word (REP2–REP11), as well as evaluation means for recognizing that a transmission of a data sequence takes place when a starting synchronization (DOT1) has been recognized or alternatively one of the further synchronizations (DOT), succeeded by a correct word synchronization (WS), has been recognized, and for evaluating data words (REP1–REP11) received each time subsequent to a recognized starting synchronization (DOT1) that is succeeded by a word synchronization (WS), or received subsequent to a recognized further synchronization (DOT) that is succeeded by a correct word synchronization (WS).

2. A network element as claimed in claim 1, characterized in that the evaluation means are arranged to use a received data sequence as a basis for the selection of a data word when the data sequence yields at least a predetermined number of correctly received repeats of the data word (REP1–REP11).

3. A network element as claimed in claim 1, characterized in that the evaluation means are arranged to select for further processing that repeat from the received repeats of a data word (REP1–REP11) in a data sequence that occurs most frequently.

4. A network element as claimed in claim 1, characterized in that the evaluation means include a memory for storing a correct starting synchronization (DOT1) and a data buffer which has a capacity at least equal to the starting synchronization for the bit-wise storage and shifting through of the received data, as well as comparison means for the continuous bit-wise comparison of the stored memory contents with the data buffer contents and for determining the number (dd(rx)) of deviating bits, the evaluation means being arranged to decide that a starting synchronization (DOT1) has commenced when the number (dd(rx)) of deviating bits is less than a predetermined number ($dd_{min}$), and that a starting synchronization (DOT1) has been correctly received when the number (dd(rx)) of deviating bits reaches zero.

5. A network element as claimed in claim 1, characterized in that the evaluation means are arranged to assume the occurrence of a change over to the second data sequence in the case of disturbed starting synchronizations (DOT1) of two directly successive data sequences after expiration of the temporal length of a data sequence as from the beginning of a first recognized synchronization (DOT) that is succeeded by a correct word synchronization (WS).

6. A method for a network element of an analog, cellular network, notably a mobile radio set or a base station, for receiving a data sequence, that is composed of a starting synchronization (DOT1), a word synchronization (WS), a data word (REP1) and a fixed number of repeats of a further synchronization (DOT), a word synchronization (WS) and the data word (REP2–REP11), which method includes the following steps: a) continuously monitoring the arrival of wide-band data streams, if any, in order to recognize whether a data transmission intended for the network element takes place, b) determining whether a starting synchronization (DOT1) can be recognized in received data streams or whether a further synchronization (DOT) that is succeeded by a correct word synchronization (WS) can be recognized, and c) evaluating the data words (REP1–REP11) subsequent to a recognized starting synchronization (DOT1) or subsequent to a combination of a further recognized synchronization (DOT) and a correctly received word synchronization (WS).

* * * * *